United States Patent [19]

Sites et al.

[11] Patent Number: 5,764,885
[45] Date of Patent: Jun. 9, 1998

[54] APPARATUS AND METHOD FOR TRACING DATA FLOWS IN HIGH-SPEED COMPUTER SYSTEMS

[75] Inventors: Richard L. Sites, Menlo Park; Sharon E. Perl, Palo Alto; G. Michael Uhler, Redwood City; David G. Conroy, El Granada, all of Calif.

[73] Assignee: Digital Equipment Corporation, Maynard, Mass.

[21] Appl. No.: 359,216

[22] Filed: Dec. 19, 1994

[51] Int. Cl.$^6$ ............................................. G06F 11/00
[52] U.S. Cl. ................... 395/183.21; 395/377; 364/264; 364/267.2; 364/267.6
[58] Field of Search ............... 395/183.21, 183.01, 395/184.01, 185.01, 183.15, 185.04, 377, 568; 364/264, 267.2, 268.1, 267.4, 267.6

[56] References Cited

U.S. PATENT DOCUMENTS

| | | | |
|---|---|---|---|
| 3,659,272 | 4/1972 | Price | 395/183.21 |
| 3,707,725 | 12/1972 | Dellheim | 395/183.21 X |
| 4,812,964 | 3/1989 | Kiya | 395/183.21 X |
| 5,058,114 | 10/1991 | Kuboki | 395/183.21 X |
| 5,127,103 | 6/1992 | Hill | 395/183.21 |
| 5,206,948 | 4/1993 | De Angelis | 395/183.21 |
| 5,274,811 | 12/1993 | Borg | 395/700 |
| 5,446,876 | 8/1995 | Levine | 395/184.01 |
| 5,488,688 | 1/1996 | Gonzales | 395/183.1 |
| 5,535,331 | 7/1996 | Swoboda | 395/183.21 |
| 5,564,028 | 10/1996 | Swoboda | 395/375 |

*Primary Examiner*—Robert W. Beausoliel, Jr.
*Assistant Examiner*—Dieu-Minh Le
*Attorney, Agent, or Firm*—Dirk Brinkman; Alfred A. Stadnicki; Thomas E. Anderson

[57] ABSTRACT

A data flow of a processor is traced while accessing data stored in a memory and in a plurality of registers during operation of the processor. The tracing involves detecting an unpredictable accessing of data on the assumption that a predictable accessing can be reconstructed without any further input. The unpredictable accessing is identified by setting and clearing a trace bit associated with each of the registers according to identifying the accessing as direct memory-to-register, register-to-register, constant-to-register, and indirect memory. If a trace bit is set on a register storing data being used as a base address during the indirect memory acceding, data flow control information, such as the base address stored in the register being used during the indirect acceding is recorded in a queue, and from the queue the information can be stored in a trace buffer. During reconstruction of the operation, the trace buffer, and a copy of the data having an initial state can be examined to analyze the data flows during the real-time operation of the processor.

23 Claims, 7 Drawing Sheets

APPARATUS AND METHOD FOR TRACING DATA FLOWS IN HIGH-SPEED COMPUTER SYSTEMS

FIELD OF THE INVENTION

The present invention relates generally to computer systems, and more particularly to a method and apparatus for tracing data flows while the computer systems are operating in real-time.

BACKGROUND OF THE INVENTION

Traces provide computer engineers with a view of process and data states while the computer systems are operating in real-time. Hardware engineers need traces to determine how new computer hardware architectures perform with existing operating systems and application programs. Specific designs of hardware structures, such as instruction processors and data memories, can have drastically different, and sometimes unpredictable utilizations for the same sets of instructions and data. It is important that any flaws in the hardware architecture be identified before the hardware design is finalized.

Software engineers need to identify critical code segments and data structures. For example, compiler writers would like to find out how the compiler schedules instructions for execution, or how well conditional branches are predicted to provide input for code optimization. Software engineers who are debugging programs would like to understand the exact execution and data flow in an errant code segment.

Prior art trace systems for simple computer chips have been obtained by connecting tracing logic to external pins of the chips which carry instruction and data address signals. However, in more recent complex chips, the internal signalling rate can be much higher than what is presented externally. In complex chips, instruction and data accesses are usually serviced by on-chip caches. Consequently, many of the referenced addresses never appear external to the chips. If an address does appear externally, it may appear substantially sooner, or later than the actual internal access because of read pre-fetching on input, and write buffering on output. In complex chips using speculative execution mechanisms, addresses which are speculatively referenced may appear externally, even if they are never used.

Tracing operation of high-speed complex chips has been further complicated by inherent architectural differences between traditional chips and complex chips. In traditional chips using CISC technology, micro-code could be modified to enable the tracing. In complex modern chips which use RISC technology, instructions are executed at a very high rate by monolithic hard-wired logic.

Also, RISC programs are usually substantially larger than CISC programs. This tends to increase the range of instructions and data addresses referenced. Furthermore, RISC processors usually have larger register sets. When these registers are used to indirectly access memory, the dynamics of the process and data flows are more difficult to observe.

A full instruction-stream trace, for a 64-bit complex processor fetching instructions at nanosecond intervals, could require a 1,200 MByte/sec recording bandwidth to trace the instruction references. In a typically RISC based system, on an average, about one in every four instructions reference data with each data address consuming four bytes. This means that a chip, running at an internal clock rate of 150 MHz, can generate an additional 150 Mbyte/sec of data references which can alter the states of the stored data structures. Such trace rates would quickly overwhelm most known tracing systems.

Some systems selectively trace operational behavior by "instrumenting" an executable image of the program. Instrumentation adds special instructions to the instruction stream to signal events which can alter the process and data states of the system. Instrumentation may have some use for tracing the operation of application programs. However, since it is practically impossible to modify a program without changing its real-time operation, instrumentation is of limited appeal to those who want to scrutinize system level operations in real-time.

Therefore, the problems to be addressed in tracing process and data flows during operation of high-speed complex chips, solutions for which are disclosed in detail below, include the following. The operation of the computer system, e. g., the execution and data flows, and the process and data states must be accurately recovered from the trace. The trace output rate must be compatible with the bandwidths of available tracing environments. And, the trace must be collected without substantially slowing down the real-time operation of the system, or substantially increase the cost of manufacture of the system.

SUMMARY OF THE INVENTION

A data flow of a processor is traced while accessing data stored in a memory and in a plurality of registers during operation of the processor. The tracing involves detecting an unpredictable accessing of data on the assumption that a predictable accessing can be reconstructed without any further input. The unpredictable accessing is identified by setting and clearing a trace bit associated with each of the registers according to identifying the accessing as direct memory-to-register, register-to-register, constant-to-register, and indirect memory. If a trace bit is set on a register storing data being used as a base address during the indirect memory accessing, data flow control information, such as the base address stored in the register being used during the indirect accessing is recorded in a queue, and from the queue the information can be stored in a trace buffer. During reconstruction of the operation, the trace buffer, and a copy of the data having an initial state can be examined to analyze the data flows during the real-time operation of the processor.

DETAILED DESCRIPTION OF A PREFERRED EMBODIMENT

Figure 1A:
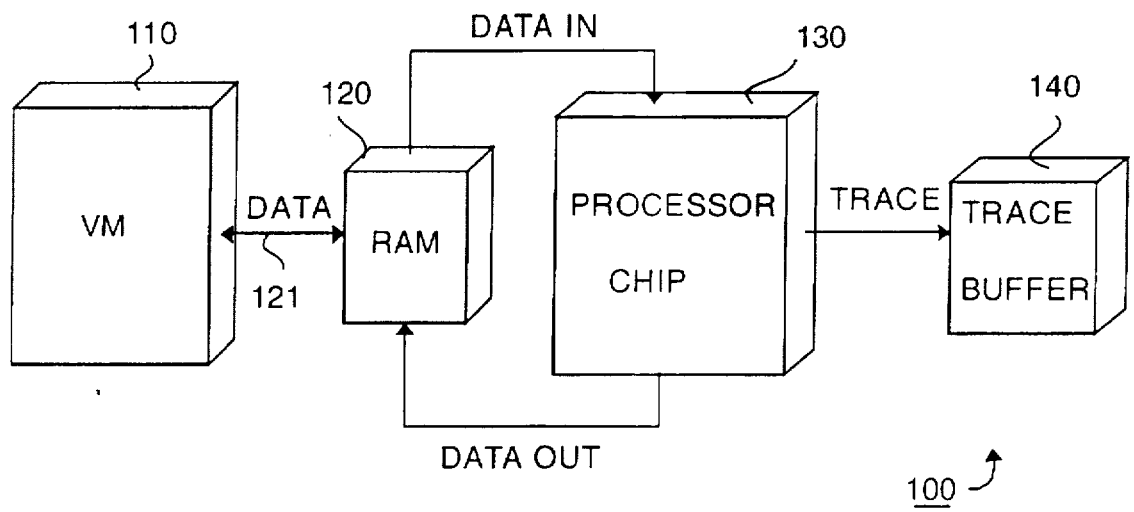
FIG. 1A is a block diagram of a system for tracing a data flow while operating a computer system.
Figure 1B:
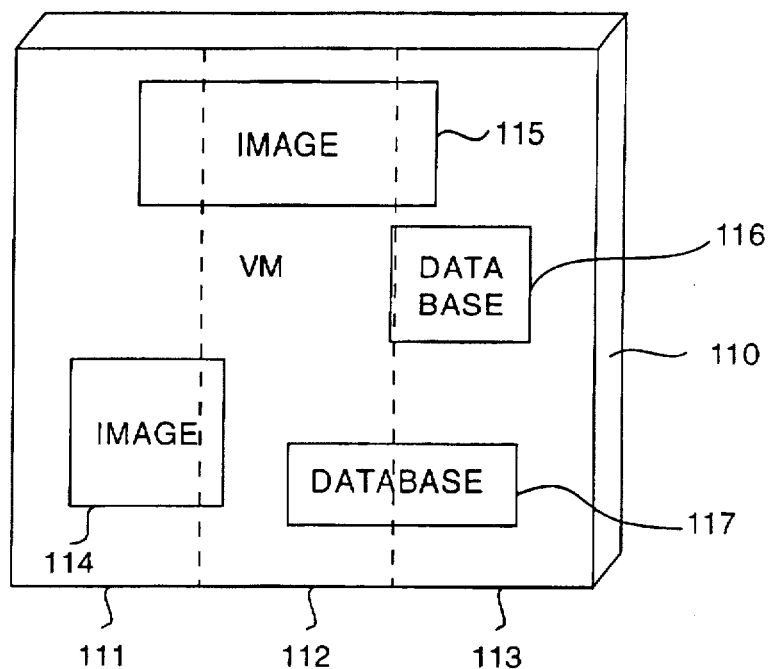
FIG. 1B is a block diagram of a virtual memory of the system of FIG. 1A.

FIG. 1A shows a computer system 100 according to the principles of the invention. The computer system 100 can include a virtual memory (VM) 110, a random access memory (RAM) 120, a processor chip 130, and a trace buffer 140. The virtual memory 110, as shown in FIG. 1B, can be partitioned into a plurality of address spaces 111–113. The virtual memory 110 may physically be implemented on a bulk storage device, such as a disk. The RAM 120 can be made of volatile semi-conductor memory chips.

Figure 1C:
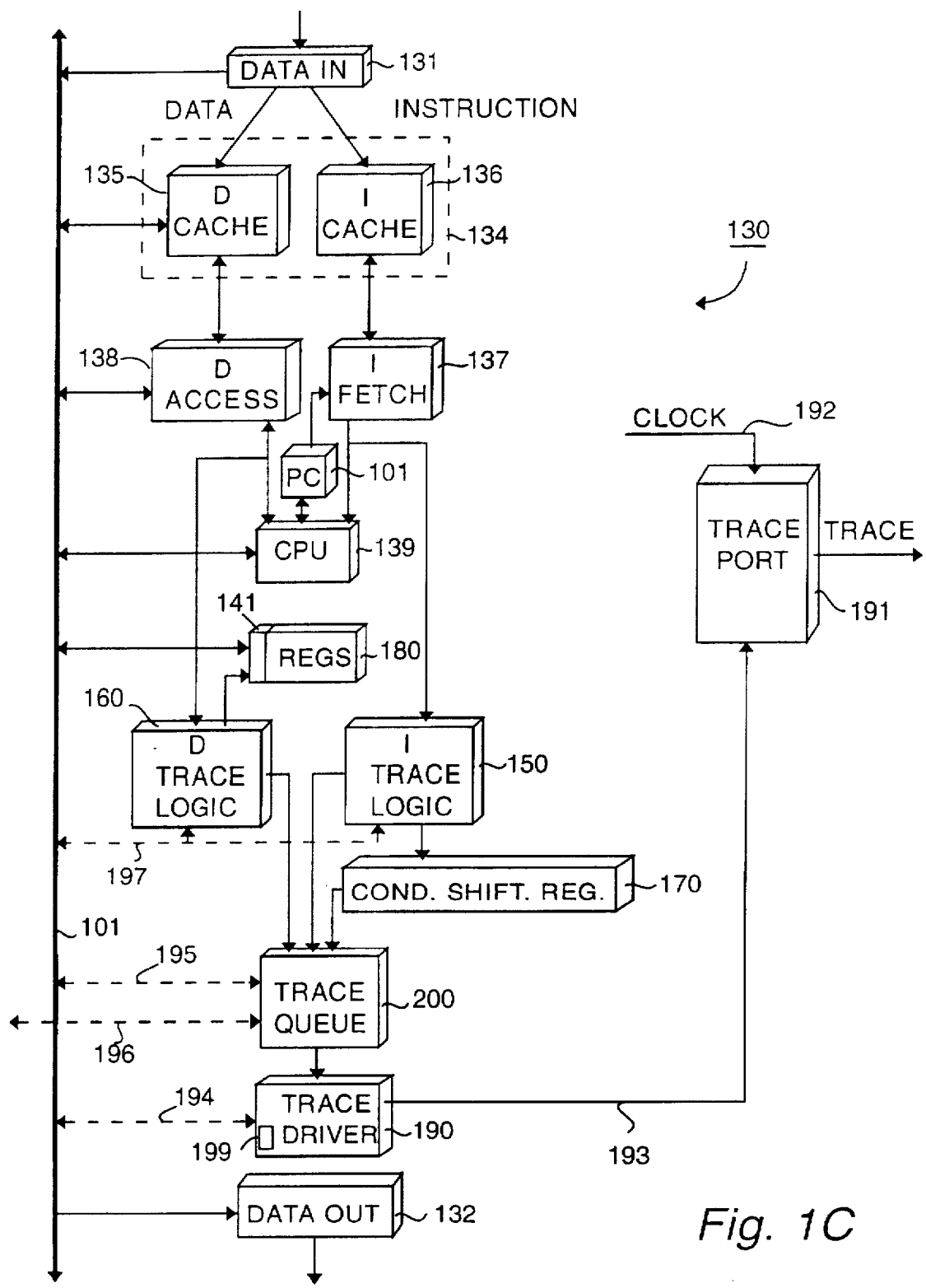
FIG. 1C is a block diagram of a processor chip of the system of FIG. 1A according to a preferred embodiment of the invention.

In the preferred embodiment of the invention, as shown in FIG. 1C, the processor chip 130 can be a complex monolithic logic chip containing millions of individual circuits. The circuits are driven by a system clock typically generating hundreds of millions of clock pulses per second. The circuits may include a central processor unit (CPU) 139, local storage in the form of general purpose registers (REG) 180, and an on-chip cache 134. The cache 134 can be partitioned into a data cache (D-cache) 135, and an instruction cache (I-cache) 136. The lines connecting the circuits, for example, a memory bus 101, can carry address, data, and control signals.

Programs, in the form of executable images 114–115, are stored in the virtual memory 110 of FIG. 1B. The images 114–115 include instructions organized to operate the computer system 100. During operation of the system 100, the instructions stored at instruction addresses can operate on data stored at data addresses. These addresses may be distinguished as physical addresses of the RAM 120, and virtual addresses of the VM 110.

The data can be in the form of constants or "literals" supplied as part of the images 114–115, or the data can be variables maintained as modifiable data structures stored in the VM 110 as, for example, databases 116 and 117. Typically, the executable images 114–115 are generated by compilers, which translate source code to object code, and linkers which combine object code into the executable images. The images 114–115 can include operating system programs, application programs, software development tools, such as editors, compilers, linkers, loaders, and debugging/analysis software.

During operation of the computer system 100, portions of the images 114–115, and, perhaps, the data structures 116–117 are transferred to the RAM 120 via a communications or input/output (I/O) bus 121. Instructions and data required for execution are presented to the processor chip 130 at input buffers (DATA IN) 131. In most systems, the addresses of fetched instructions and accessed data are not related. Therefore, the data and instructions are typically separately maintained in the D-cache 135 and the I-cache 136 to take full advantage of spatial and temporal localities experienced by the instructions and data during processing.

While the CPU 139 is operating, data access circuits (D-access) 138, and instruction fetch circuits (I-fetch) 137 supply, respectively, data and instructions to the CPU 139 for processing. The instructions are fetched from instruction addresses maintained in a program counter (PC) 101. The instructions typically include an operator, and one or more operands. The data are accessed for reads from data addresses specified by the operands of the instructions. Data undergoing immediate manipulation are usually maintained in the registers 180. Processed data are presented to output buffers (DATA OUT) 132 for storage in the volatile memory 120, and the persistent virtual memory 110, thereby modifying the states of the data structures 116–117.

It is desired to observe the operation of the computer system 100 while, for example, the image 114 is executing and modifying the database 116. The operation of the computer system 100 can be deduced by observing the execution and data flows, e.g., the address values of the executing instructions, e.g., the PC 101, and the memory data addresses accessed by the operands of the instructions. These addresses are generated, for example, by the fetch and access circuits 137–138. However, as stated above, in a high-speed chip, the rate at which instruction and data addresses change is well beyond that which can be collected by conventional tracing systems in real-time.

According to the principles of the invention, specific embodiments of which are described in further detail below, the ratio between the recorded and observed events is significantly decreased to decrease the bandwidth of the trace. Specifically, a subset of all addresses referenced by the fetch and access circuits 137–138 is actually recorded in the trace. The subset being a minimum number of addresses necessary to accurately reconstruct the execution flow of the image 114, and the data flow to and from the data structures 116–117. More specifically, according to the invention, only unpredictable changes of states are recorded. Predictable changes are not recorded, since it is assumed that these changes can be reconstructed without knowing the real-time operational conditions of the system.

Therefore, the processor chip 130 includes an instruction trace logic 150 and a data trace logic 160 coupled to, for example, the fetch circuit 137 and the access circuits 138, respectively. The purpose of the trace logics 150 and 160 is to detect and identify those events which are significant for an accurate reconstruction of the real-time operation of the computer system 100. Significant events include unpredictable events, or events which depend on variables which can only be resolved at run-time.

Although the exemplary embodiment shows the tracing logics coupled to the fetch and access circuits 137–138, it should be understood, that in other architecturally different processor chips, the tracing logic can be connected to the circuits of the processor chip 130 in different manners.

Outputs of the logics 150 and 160 are coupled to a trace queue 200. The queue 200 provides storage for trace entries which characterize significant, or unpredictable trace events. The trace entries include an identity of the events, and flow information related to the events. The trace queue 200 also receives input from a conditional shift register 170, described further below. A trace driver 190 transfers the trace entries from the trace queue 200 to a trace port 191 via a line 193. The data are clocked by clock signal (CLOCK) 192 from the trace port 191 to, for example, the off-chip trace buffer 140 of FIG. 1A.

The functions of alternative connections, for example, the dashed lines 194–197, will be described in detail below with respect to other embodiments of the invention.

Figure 2:
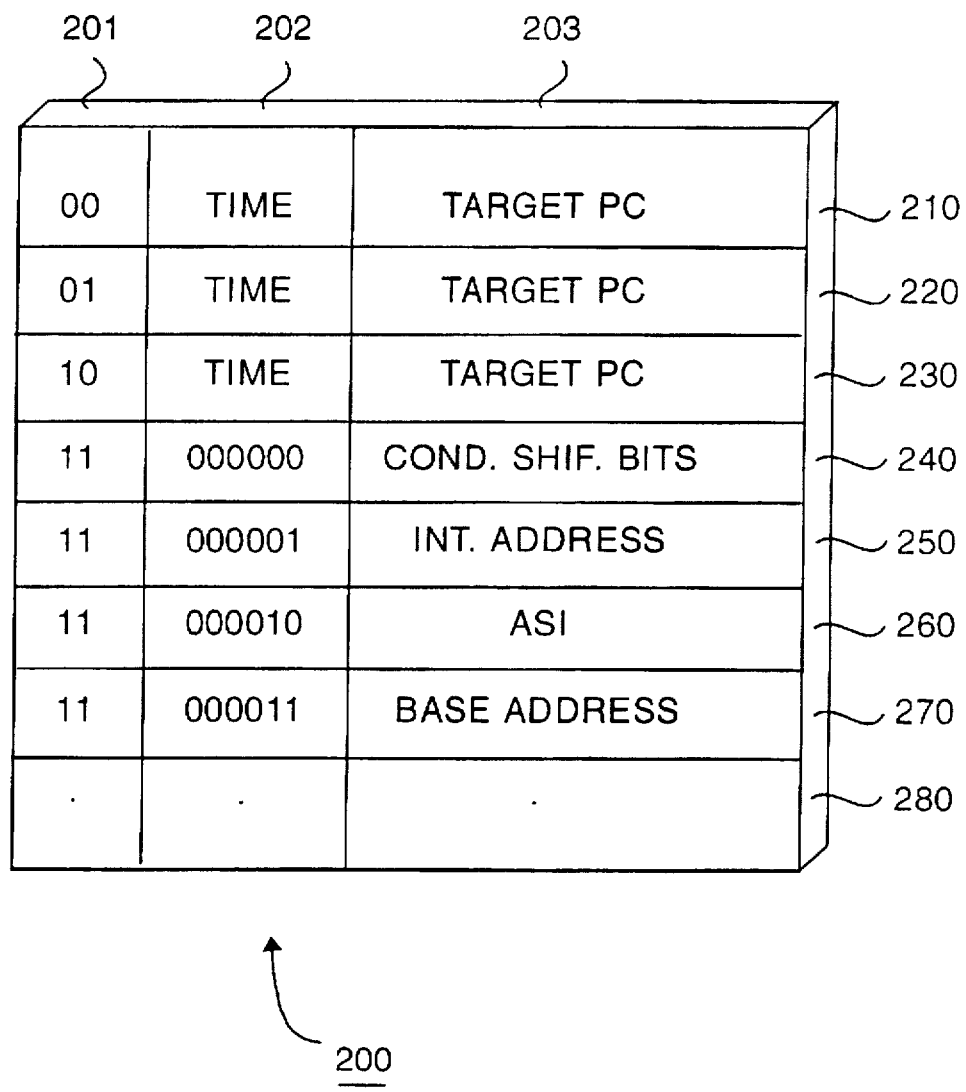
FIG. 2 is a block diagram of trace event entries of a trace queue of the system of FIG. 1.

Now with reference to FIG. 2, the trace queue 200 can be configured as a first-in/first-out (FIFO) queue having a plurality of entries 210, 220, . . . , 270, 280. Each entry stores the identity and the flow information characterizing the significant traceable event.

Each entry includes, for example, three fields 201–203. The contents of the fields dependent on the identity of the recorded event. Specific encodings and allocations of the fields 201–203 are shown. However, other variations are also possible.

The width and depth of the queue 200 can vary. In the exemplary embodiment, a depth of the queue 200 can be four, or the shown eight entries. Each entry is, for example, forty bits wide. The width of the trace port 191 is four bits, e.g., four pins external to the chip 130. Therefore, in this embodiment, the trace driver 190 requires ten clock pulses to write each entry to the trace buffer 140. The width and depth dimensions can be altered to suit the internal and external physical configuration of the chip 130.

In the case where the queue 200 fills up, e.g., entries are added faster than they can be clocked out of the trace port 191, fetching of the instructions can be suspended until the port 191 catches up. This may slow down real-time operations, but preserves an accurate tracing. Alternatively, events encountered during a "queue full" condition can be discarded until the queue 200 is not full, and a special entry can be added to the queue 200 at that time to indicate that event recordation was suspended. In this alternative, real-time execution and tracing is maintained at the cost of some data loss.

The principle of the invention for tracing execution and data flows is based on the following general observations. In modem "optimized" executable images, an effort is made to execute as many instructions in sequence as possible to improve performance. This means that the execution flow, either linear, circular, or otherwise, is urged to be predictable. Also, an effort is made to make the access path to data stored in the memory as short as possible, e.g., preferably the data are accessed directly. When data are accessed directly, changes to the states of the data structures are predictable. The improvements achieved by the invention are realized, in part, by detecting and recording only those events which can cause a deviation from the predictable process and data states.

Figure 3A:
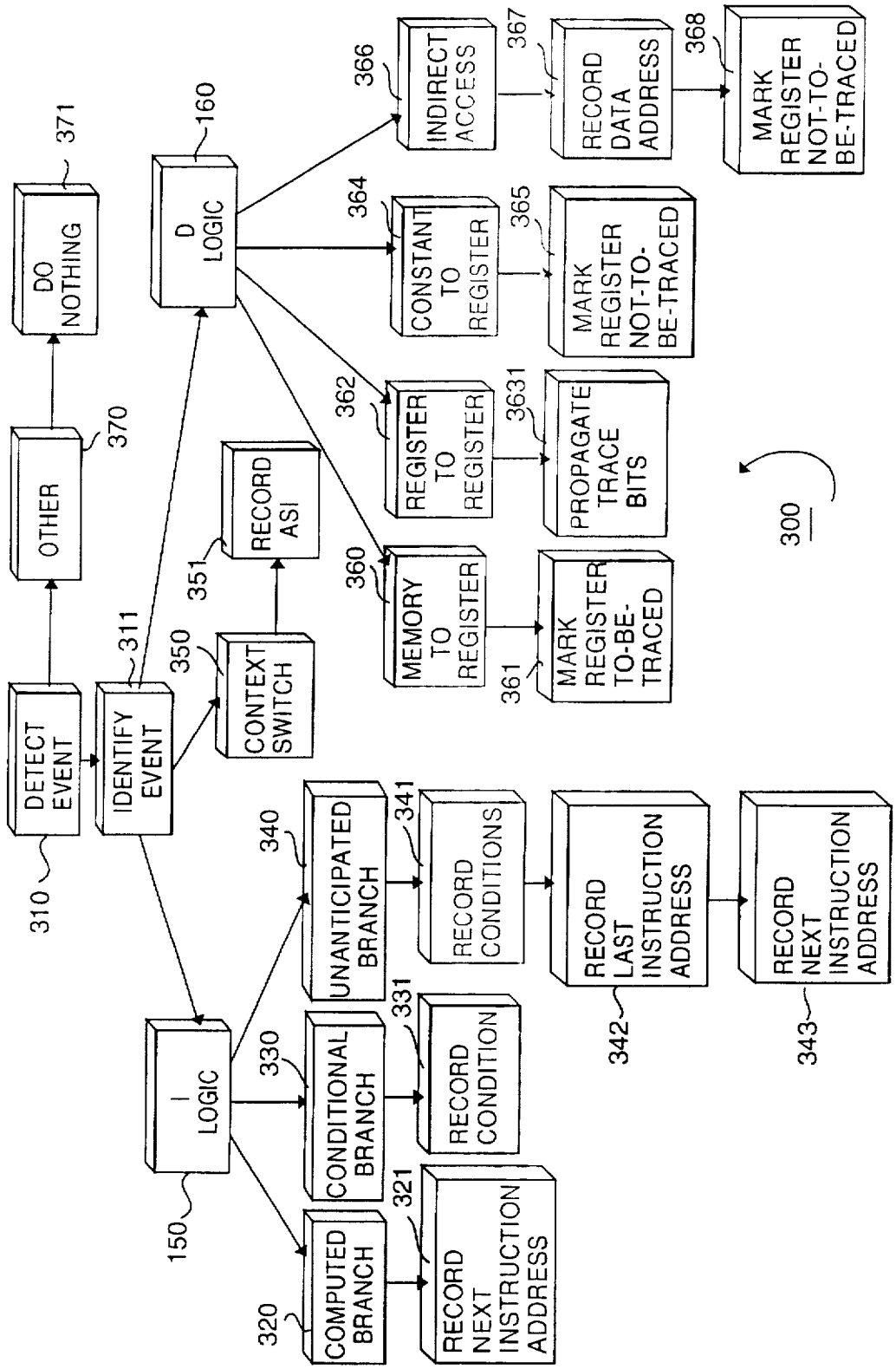
FIG. 3A is flow diagram of a process for collecting the trace events of the queue of FIG. 2.

A process 300 which can be used to detect and record events which cause process and data states of the system 100 to change unpredictably is shown in FIG. 3A. The process 300 can be implemented, in part, with the logics 150 and 160.

In step 310, for each processing event of the CPU 139, detect those events which can cause the system 100 to operate in an unpredictable manner. In step 311, identify the detected events as being execution (I-logic 150) or data (D-logic 160) related. Any other events, which do not effect the predictable operation of the system 100, and therefore, do not need to be recorded in the trace for an accurate reconstruction, are identified as OTHER, step 370.

The cases of events which can cause a deviation from a predictable, e.g., linear, circular, etc., execution flow are processed beginning at steps 320, 330, 340. The cases of events which can cause indirect data accesses are processed beginning at steps 360, 362, 364, and 366.

Three events, detectable by the I-logic 150, can cause a deviation, e.g., "branching," from, for example, a linear execution flow. They are a computed branch event (320), a conditional branch event (330), and an unanticipated branch event (340), e.g., an asynchronous interrupt.

A computed branch event can either be a JUMP instruction, a CALL instruction, or a RETURN instruction. Execution flow information related to computed branch events is recorded in the queue 200 of FIG. 2 as instruction trace entries 210, 220, or 230, respectively, for JUMP, CALL, or RETURN instructions, as follows.

The first, for example, two-bit field 201 of the entries 210, 220, or 230 can be used to differentiate the JUMP, CALL, and RETURN instructions, e.g., "00", "01", and "10". A second six-bit field 202 can be used to record the time when the event occurred. The time can be recorded as the low-order six bits of, for example, a microsecond counter. The recorded time can be useful for localizing hard-to-identify performance problems, where the execution flow rate is different than an expected rate.

The third field 203 can store the execution flow information related to the event, the information to include the real-time computed non-sequential instructions address, e.g., target PC, of a next instruction to be fetched. Depending on the size of the fields 201–203, other trace related information that may be of subsequent use during reconstruction may also be recorded. For example, in a multi-processor system, the flow information can include an identity of one of the processors.

The recordation of the entries for computed branch events is shown as step 321. It is intended that the CALL instruction can include those instructions which cause the processor to operate in some other mode, for example, a system, kernel, or supervisory mode. If this is the case, the execution flow information can include information representing real-time processor modes.

For a conditional branch event (step 330), a condition of a real-time logical state of the computer system 100 is recorded, for example, in the conditional shift register 170 of FIG. 1C, step 331. In the example embodiment, the conditions are assumed to be binary, e.g., logically TRUE or FALSE, and therefore, only one bit is required to record a condition necessary to reconstruct a two-way branch. However, it should be understood the invention can also be worked with conditional branch events having a higher order than two, by allocating additional bits for the recordation of each condition.

It should be noted, that iterative, or recursive loops, optimized to have invariant code removed, are frequently used in modem code. As an advantage, the recordation technique of the invention only consumes one bit of trace bandwidth for each cycle through the loop, of which there may be hundreds, each loop, perhaps, including dozens of instructions.

Figure 3B:
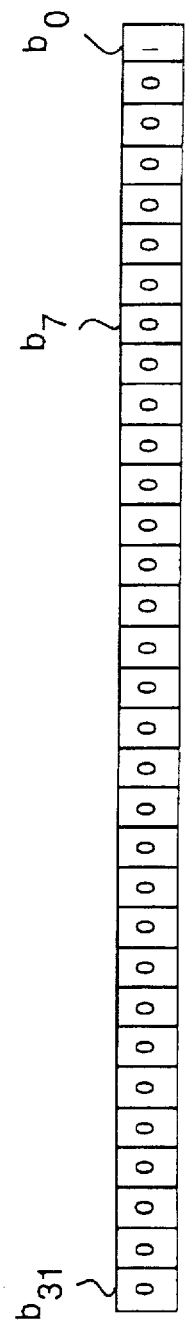
FIG. 3B is a block diagram of a shift register, after initialization, used by the invention.
Figure 3C:
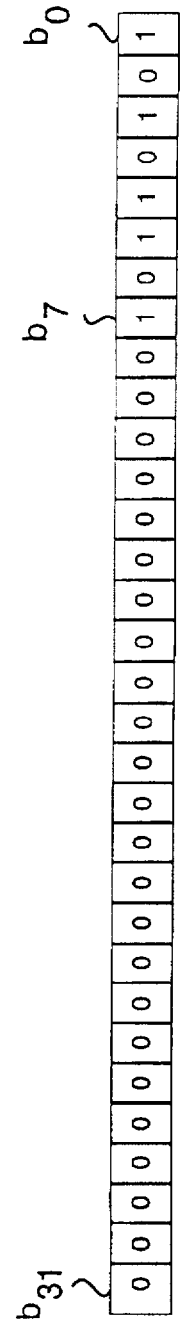
FIG. 3C is a block diagram of the shift register of FIG. 3B during operation.

The shift register 170 can be a thirty-two bit shift register as shown in greater detail in FIGS. 3B and 3C. FIG. 3B shows the shift register 170 in an initial state, and FIG. 3C shows the register 170 during operation. The thirty-two bits of the shift register 170 can be labelled right-to-left, for example, $b_0$–$b_{31}$. In the initialized state, the low order or right-most bit $b_0$ of the shift register 170 is set to a logical one (1), and bits $b_1$–$b_{31}$, are set to a logical zero (0).

After initialization, the real-time logical states used to conditionally direct the execution flow of the system 100, for example, TRUE or FALSE, are respectively shifted into bit $b_0$ as a logical "1" or a "0", causing the initialized value of bit $b_0$ to be shifted to bit $b_1$, and so forth. Thus, during operation, as shown in FIG. 3C, a logical one in bit $b_7$, with bits $b_8$–$b_{31}$ storing all zeroes, would indicate that seven conditions of conditional branch events are recorded, e.g left-to-right "0110101". The leading bit, in other words, represents "a count" of the number conditions stored. By recording the real-time logical states in order of occurrence, conditional branch instructions encountered during reconstruction can be properly taken.

The shift register 170 can be written to the queue 200 as a COND entry 240, after bit $b_{31}$, receives the leading logical one bit of the shifting bit train. Writing the shift register 170 to the queue 200 returns it to the initialized state shown in FIG. 3B. Other encodings of the condition values are possible. However, for reasons stated below, with respect to the recording of the shift register 170 after an unanticipated branch event, it is important that the number of conditions accumulated in the shift register 170, e.g., "the count", is known at any time.

For the COND entry 240, the first field 201 stores a "11", and the second field 202 stores "000000". That is, for this type of entry, as well as entries 250, 260, and 270 described below, the first and second field 201–202, in combination, are used to differentiate the identity of the entries.

Unanticipated branch events, beginning with step 340 of FIG. 3A, are recorded as follows. An unanticipated branch event can be generated by a hardware or software induced interrupt signal. If the condition shift register 170 stores any conditions, e.g., bits, e.g., $b_1$–$b_{31}$ are not zero, record the shift register 170 in the queue 200 as a COND entry 240 in step 341, otherwise, the shift register 170 does not need to be recorded. This captures the logical states of the system necessary to reconstruct the conditional execution flow up to the instant in time when the interrupt occurred.

Then in step 342, the instruction address of a last instruction fetched, prior to the interrupt, is recorded in the field 203 of an INT entry 250. The INT entry 250 can be differentiated by the "11" and "000001" in the first and second fields 201–202 of the entry. Last, in step 343, the target PC or instruction address of a next non-sequential instruction to be fetched is recorded as a JUMP entry 210.

Tracing of data flows according to the principles of the invention is now described. During a typical operation of the system 100, about a quarter of the instructions access data stored in the memory. Recording every memory access in a high-speed processor, if at all possible, could generate hundreds of Mbytes of traced data addresses easily overwhelming the bandwidth of most traditional tracing environments. Some of the features of the invention which reduce the number of traced data addresses are follows.

As previously stated, changes to the data structures of the memory can predictably be reconstructed as long as the memory accesses are direct or from predeterminable addresses. However, in modern "optimized" programs, accesses to data are frequently performed indirectly using a base data address stored in one of the registers 180 as an index. The base address frequently being some variable which is only resolvable at run time. For example, during list processing, it is common to have many indirect memory accesses using the same base addresses and various offsets from the base address.

In one embodiment of the invention, the detection and recordation of unpredictable or indirect data flow is achieved as follows. Each one of the registers 180 of FIG. 1C is provided with a "trace" bit 141. The trace bit 141 allows each of the registers 180 to be marked as "to-be-traced" by setting the trace bit 141 to a logical one, and as "not-to-be-traced" by setting the trace bit 141 to a logical zero.

It should be noted that the trace bit 141 is actually associated with the data stored in the registers 180 and not with the registers 180 themselves. If all, or any portion of data are sourced from a register marked as to-be-traced, the destination register is also marked as to-be-traced. Any registers receiving data entirely from registers which are marked as not-to-be-traced are, or remain marked as not-to-be-traced. In other words, the "to-be-traced" and "not-to-be-traced" status are propagated with the data, as the data moves through the registers during processing. It is assumed here that a single instruction can derive data for a destination register from one or more source registers.

The events which effect the marking of the traces bits 141 of the registers are processed as follows. Step 360 is used for a direct memory-to-register data access. Step 362 is used for a register-to-register data access. Step 366 is used for a constant-to-register access. And, step 366 is used for any indirect memory access.

In step 360, if the access is memory-to-register, for example, a LOAD register type of instruction, mark the destination register as to-be-traced in step 361. The assumption is that the value loaded from memory can be a run-time variable which may potentially be used as a base address in an indirect memory reference.

In step 362, if the access is register-to-register, propagate the trace bit 141 to the destination register, step 363. That is, if any of the source registers are marked as to-be-traced, then mark the destination register as to-be-traced. If all of the source registers are marked as not-to-be-traced, mark the destination register likewise.

In step 364, if the data access is constant-to-register, unconditionally mark the destination register as not-to-be-traced.

In step 366, if the memory access, e.g., read or write, is indirect, and the base address is stored in a register marked as to-be-traced, then generate a DATA ADDRESS entry 270 in the queue 200, step 367. The DATA ADDRESS entry 270 has fields 201–202 set to "11" and "000011", and field 203 set to the base address which used to compute the indirect access. After recording the entry 270, mark the register as not-to-be-traced, step 368. For any other data access, do nothing.

If the system being traced uses a virtual memory, there is one additional event, a "context switch", which may unpredictably effect the interpretation of instruction and data addresses. Context switching is the swapping of portions of the address spaces 111–113 in and out of the RAM 120 by, for example, a paging mechanisms. Associated with the address spaces 111–113 of the VM 110 are address space identifiers (ASI). Thus, in effect, the virtual addresses of the VM 110 are indirectly accessed via the physical addresses of the RAM 120 using the associated address space identifiers.

Therefore, in step 350, for either an instruction or data trace, a context switch event is detected. In step 351, the address space identifier (ASI) entry 260 is recorded in the queue 200. The ASI entry 260 stores "11" and "000010" in fields 201–202, and the address space identifier in field 203. The ASI can be used during reconstruction to "mimic" the real-time context switching experienced by the system 100, as described in further detail below.

This covers all cases of significant events which should be recorded in the trace in order to accurately reconstruct the execution and data flow of a real-time operation of the system. For any other "insignificant" or predictable event, step 370, not necessary for an accurate reconstruction, nothing is done, step 371. It is here, in part, that the compression of the trace is realized.

Whereas, prior art traces may generate well in excess of 1000 Mbytes of trace data per second of execution flow, the apparatus and method disclosed herein record at the rate of about 1M entries per second. If each entry is five bytes, as shown in the example embodiment, the nominal trace data rate of the present trace is about 5 Mbytes per second, a 1:200 compression ratio.

The trace of the data flow is also reduced. In an "average" RISC image, a base address in a register may be used about ten times before it is changed. Thus, a traditional 150 Mbyte/second full data address trace can be compressed to 15 Mbyte/second on the average. Better compression can be achieved for large data structures accessed as indexed matrices.

Combined with the 5 Mbyte/second instruction address trace, this gives a total data rate out of the trace port 191 of FIG. 1C of 20 Mbyte/second. This amount of data can easily be clocked out of the 4-pin trace port 191 if the CLOCK signal 192 runs at a practical rate of 40 MHz.

Figure 4:
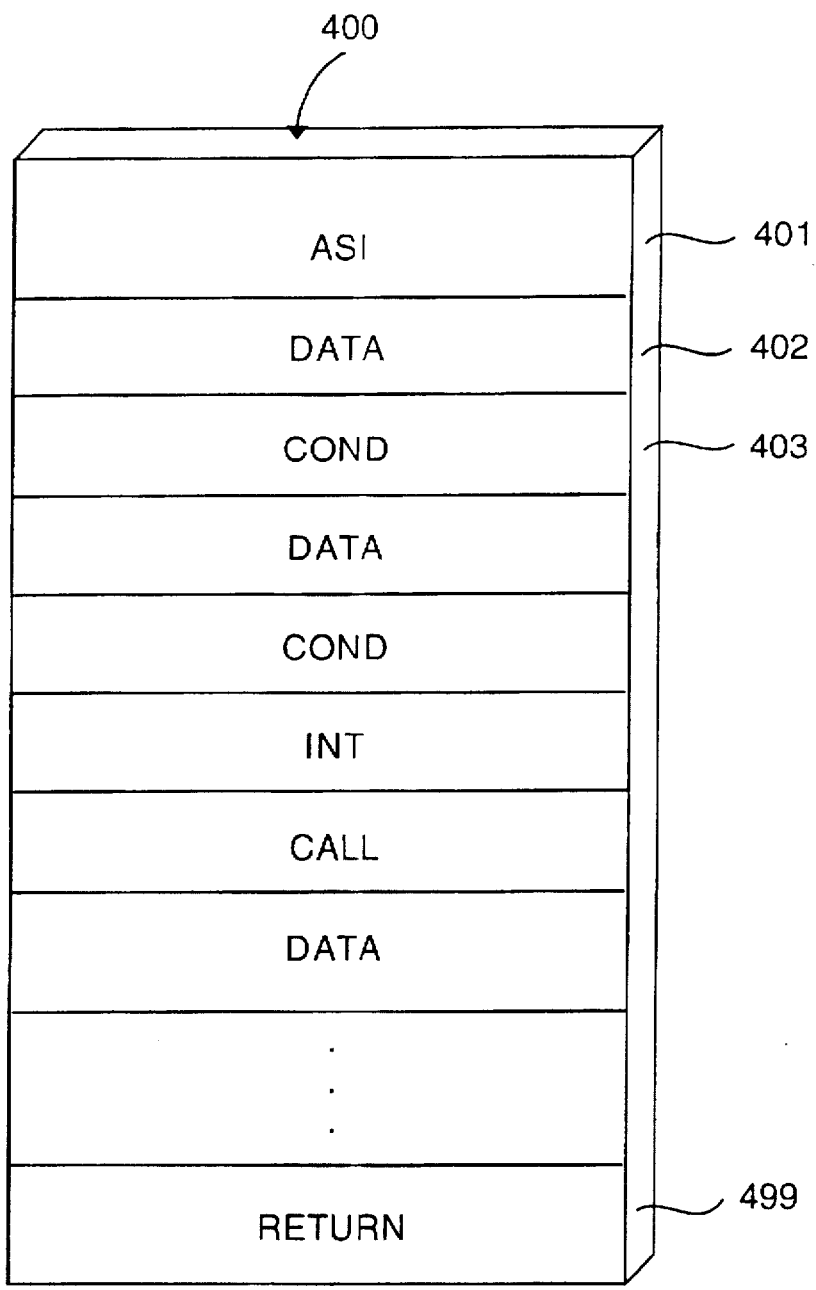
FIG. 4 is a block diagram of an example trace according to the invention.

A partial example trace 400 which can be recorded in the trace buffer 140 is shown in FIG. 4. The trace 400 has entries 401–499. Note, the first entry 401 is an ASI entry, and the second entry 402 is a JUMP entry. These initial two entries 401–402 can have been artificially recorded in the trace buffer 140 during initialization of the trace. The purpose of these two entries is to establish, in a virtual memory system, an inial address space context and a starting instruction address for the reconstruction. Therefore, the actual real-time beginning of the example recorded trace is the JUMP entry 403.

Figure 5:
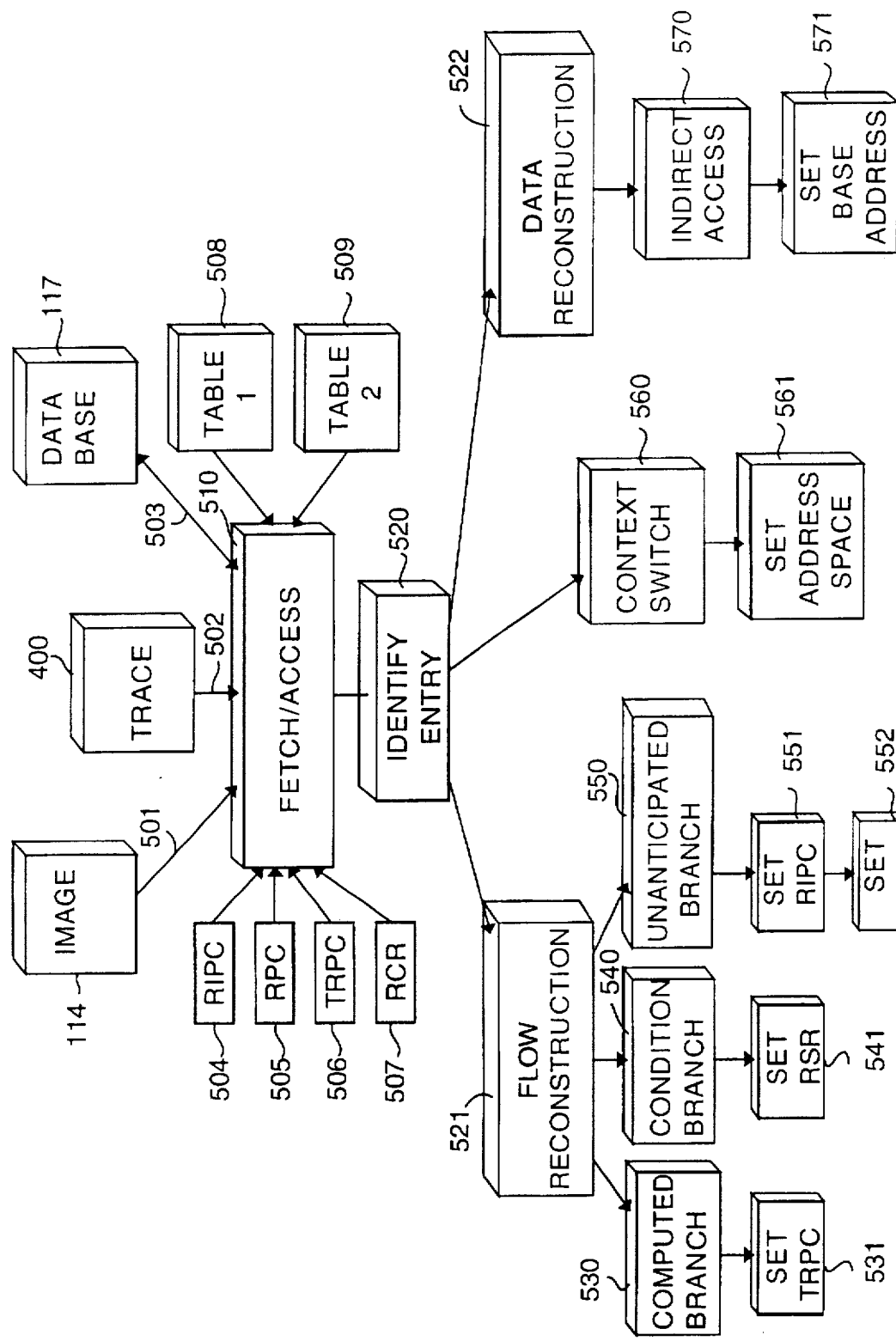
FIG. 5 is a flow diagram of a process which can be used to reconstruct the trace of FIG. 4.

FIG. 5 is a flow diagram of a process 500 which can be used to reconstruct the real-time operation of the system 100. The process 500 receives as input, for example, the image 114, and the data structure 117. The process 500 also receives the trace 400. It should be noted, that a first order approximation of the operation of the system 100 could solely be derived from the trace 400.

During reconstruction, the image 114 is used as an input stream 501 of instructions. The database 117 can be a copy of the data structure 116 having some initialized state. The entries of the trace 400 are used as a control stream 502 for the replay of the execution and data flows as they were during the real-time operation.

In a virtual memory system, two additional data structures can be used during reconstruction to translate physical instruction and data addresses to image names and virtual memory addresses. An address space identifier table (TABLE 1) 508 translates the address space identifiers 209 of the ASI entries 260 of the trace 400 to image names. An image name table (TABLE 2) 504 translates image names to virtual address values of the image in the virtual memory 110. These two tables can be produced as a by-product of the linker or loader which is used to assemble the image 114. The reconstruction process 500 also uses a reconstruction PC (RPC) 505 as an index into the image 114 for fetching instruction.

During reconstruction, instructions are fetched from the image 114, and data are accessed in the data structure 117 by step 510. The fetching of instructions and accessing of data is controlled by the entries 401–499 of the trace 400. Notwithstanding the control stream 502, the instructions are fetched from the image 114 in a known manner, for example, sequentially, to reconstruct the predictable portion of the execution flow. During predictable fetching, the instruction address of a next instruction to be fetched can be computed by adding the length of the current instruction to the instruction address of the current instruction. Similarly, data are accessed directly in the data structure 117.

However, the fetching of instructions may be non-sequential, and the accessing of data may be indirect. This unpredictable operation can be resolved and reconstructed using the entries of the trace 400. In step 520, the next entry of the trace 400 is identified as process control 521, or data control 522. The cases of the identified entries are handled beginning in steps 530, 540, 550 for process control, and step 570 for data control. Step 560, in either case, is used to reconstruct context switches.

If the next entry of the control stream 502 is a computed branch type of entry 210, 220, or 230, set a target reconstructed PC (RTPC) 506 to the instruction address value found in the target PC field 203 of the entry in step 531. In step 532, continue fetching instructions until the identified instruction, e.g. JUMP, CALL, or RETURN is encountered. Then, in step 533, set the RPC 505 to the TRPC 506 to fetch the next non-sequential instruction.

If the next trace entry is a conditional branch entry (step 540), save the conditional branch bits 203 in a reconstruction shift register (RSR) 507, step 541. The operation of the RSR 507 is essentially, the reverse of what was described for the shift register 170 of FIGS. 3B and 3C. Recall, the leading or left-most "1" bit of the shift value indicates the number of conditions that were accumulated in the shift register 170 before it was queued. Therefore, shift the bits left until the leading bit is shifted out of bit $b_{31}$ of FIG. 3B. The number of times the bits were shifted can be used to determine the count value of the number of conditional bits stored in the RSR 507. Then, for any subsequently fetched conditional branch instructions, take the branch as indicated in the high order condition bit of the RSR 507 and shift the bits left.

If the next entry is an INT entry 250, save the interrupt address value 203 in an reconstruct interrupt PC (RIPC) 504, step 551. Then, fetch the next JUMP entry 210 to determine the next TRPC 506, in step 552. Recall, the JUMP entry 210 was recorded in step 242 of FIG. 3. Continue fetching instructions, taking branches as necessary until the RPC 505 is equal to the RIPC 504, and all the prior saved conditional branch bits have been consumed. The number of outstanding conditions can be determined, as explained above, from the count value extracted from the RSR 507.

This takes care of the situation where the interrupted execution flow is in a tight iterative or recursive loop with no intervening computed branch instructions. In this case, the program may fetch instructions from the same instruction address a multiple number of times, up to the instant of the interrupt. Therefore, during reconstruction, it is important that the loop be replayed exactly the same number of times, before the interrupt is reconstructed. Then, when the RPC 505 matches the RIPC 504, and all outstanding branch bits of the RSR 507 are consumed, set the RPC 505 to the TRPC 506. At this point, the reconstruction can optionally be marked with "an interrupt occurred here" notation.

If the next entry is a DATA ADDRESS entry 270, then, on the next indirect memory access having a variable as a base address, supply the base address 203 of the DATA ADDRESS entry 270 to the register, step 571. This value can then be used as the base address to reconstruct subsequent indirect memory accesses using the register.

Now, a gain with reference to FIG. 1C, an alternative implementation of the trace buffer 140 is described. Instead of connecting the trace driver 190 to the hardwired and dedicated trace port 191, the trace driver 190 can also write the entries of the queue 200 to the RAM 120 having a portion allocated as a trace buffer. In this embodiment, the trace driver 190 is alternatively connected to the data out buffer 132 via the line 194 and the memory bus 101. The trace driver 190, in this case, includes a memory 199 in the form of, for example, two registers having addresses on the memory bus 101.

A first register of the memory 199 of the trace driver 190 stores a beginning address (tb_address) for the trace buffer in the RAM 120. A second register stores a size (tb_size) of the trace buffer. These two registers can be initialized with the values tb_address and tb_size at the beginning of the trace collection procedure. The trace driver 190 writes the entries of the queue 200 to the trace buffer 140 of the RAM 120 in, for example, a circular fashion.

This arrangement does not require the dedicated trace port 191, the external pins, and extra memory for the trace buffer 140. The processor chip 130, thus, becomes self-tracing, at a relative small cost of memory space, and perhaps, a 10% extra load on the memory bus 101. The image 115 of FIG.

1B could be used to monitor or process the trace stored in the RAM 120 in real-time. Alternatively, the image 115 can store the trace in the VM 110 for later analysis, such as PC histogramming, and cache hit-to-miss ratio calculations.

In yet another embodiment, the trace queue 200 is coupled directly to the memory bus 101 or the RAM 120, respectively, by line 195 or line 196, e.g., associated with the trace queue 200 are bus or memory addresses for directly accessing the entries of the queue. In this case, the trace queue 200, at the expense of the trace driver 190 and trace port 191 no longer required, can be made larger, perhaps thirty-two entries. Upon reaching a full condition, the trace queue 200 generates an interrupt. The image 115, in response to detecting the interrupt, can read the trace queue 200 and reintializes it. If the trace queue 200 is directly coupled to the RAM 120, the implementation does not effect the load on a critical memory access path, e.g., the bus 101, with some reduction in performance. This particular implementation would be attractive in processor chips of the type that include on-chip interrupt handling capabilities, such as the ALPHA chip set made by DIGITAL EQUIPMENT CORPORATION, Maynard, Massachusetts.

In order to facilitate specialized debugging and tracing tasks, and further reduce the bandwidth of the trace, additional control logic may be provided. For example, the instruction trace logic 150 or the data trace logic 160 can be selectively disabled so that an instruction-only or a data-only trace are recorded.

The logic 150 and 160 can also be provided with address range information via line 197. The range information partitions the virtual memory into traced and untraced segments. The size of the segments can be expressed as a power of two number. In the case of instruction tracing, the transitions between traced and non-traced segments can be handled as follows. In response to detecting a transition, the shift register 170 is recorded, as described with reference to step 341 of FIG. 3. Following the COND entry 240, a JUMP entry 210 can be recorded as in step 343. The target PC field 203 will have a value which is the next traced, or untraced address, depending if the transition is from untraced, or traced segment addresses, respectively.

For data tracing, the trace bits 141 of the registers 180 are maintained as described for step 360, 362, 364, and 366. However, access to data in an untraced memory segment does not result in a recordation of DATA ADDRESS entries 270, nor in the clearing of the trace bits 141. Thus, the trace bits 141 continue to reflect whether a particular base address is part of the trace, or not.

In conclusion, the tracing system as described herein provides a method and apparatus for compressing instruction and data traces observed in a complex high-speed computer chip. Substantially higher chip speeds can be accommodated via a wider trace port and a higher clock rate. The reconstruction provides for a full replay of all instructions executed and all changes to the database. The replay may be modified to provide a "fast-forward" capability, processing entries of the trace, without replaying every instruction of the image. In addition, in a computer system having multiple processor chips, a consolidated trace can be recorded, with a processor identification field differentiating trace entries of different processors.

Although the preferred embodiments are described with reference to a hardware implementation, it should be understood that the principles of the invention can also be used to guide the instrumentation of code in a software tracing implementation. Instead of detecting the traceable events with hardware as described herein, the events can be signalled in the executable image by instrumented instructions. The signalling instructions can be in the form of software generated interrupts or calls, for example. Each interrupt or call instruction causing the execution of a routine for recording the appropriate event information as shown in FIG. 2. For example, a JUMP instruction would be preceded by an instrumentation instruction which causes the recording of the target PC, etc. Here, the advantage would be that the instrumented code would be minimally modified to closer approximate real-time tracing with a software solutions.

Disclosed are illustrative embodiments of the invention described using specific terms and examples. It is to be understood that various other adaptations and modifications may be made within the spirit and scope of the invention. Therefore, it is the object of the appended claims to cover such all such variations and modifications as come within the true spirit and scope of the invention.

We claim:

1. An apparatus for tracing data flows during an operation of a processor comprising:
    a memory storing a data structure having an initial state, the data structure including addresses, the addresses for accessing data of the data structures;
    a plurality of registers storing the data while the data structure is manipulated by the processor, wherein each of the plurality of registers further includes a trace bit;
    means for accessing the data stored in the memory and in the plurality of registers;
    means, coupled to the means for accessing, for detecting an unpredictable accessing of the data;
    means for propagating the trace bit from a source register to a destination resister during an accessing of the data; and
    means, responsive to the unpredictable accessing of the data, for recording information related to the unpredictable accessing of the data to trace the data flows while the data structure is being manipulated by the processor.

2. The apparatus as in claim 1 further comprising:
    means for identifying the accessing of the data as direct memory-to-register, register-to-register, constant-to-register, and indirect memory;
    means for setting the trace bit of the register receiving the data during the direct memory-to-register accessing;
    means for clearing the trace bit of the register receiving the data during the constant-to-register accessing;
    means for recording the data of the register being used to determine an indirect address of the data structure during the indirect memory accessing if the trace bit of the register being used to determine the indirect address of the data structure is set.

3. The apparatus as in claim 2 further comprising: means, responsive to the information being recorded, for clearing the trace bit of the register being used to determine the indirect address of the memory.

4. The apparatus as in claim 1 further comprising:
    means for recording a time of an occurrence of the unpredictable accessing of the data with the information related to the unpredictable accessing of the data.

5. The apparatus as in claim 1 further comprising:
    a queue storing the information related to the unpredictable accessing of the data, the queue having a plurality of entries, each entry storing the information for an occurrence of the unpredictable accessing of the data;

a driver reading the information stored in the plurality of entries of the queue;

a trace buffer connected to a port of the processor, the port communicating the information read by the driver from the queue to the trace buffer, the port communicating the information at a rate determined by a clock signal generated by the processor.

6. The apparatus as in claim 1 further comprising:

a queue storing the information related to the unpredictable accessing of the data, the queue having a plurality of entries, each entry storing the information for an occurrence of the unpredictable accessing of the data;

means for signaling when the queue is full; and means, in response to a signal which indicates that the queue is full, for communicating the information from the queue to the memory.

7. The apparatus as in claim 5 wherein the trace buffer is an allocated portion of the memory.

8. The apparatus as in claim 5 further comprising:

means for accessing a copy of the data structure having the initial state;

means for reading the information stored in the trace buffer; and means for processing the copy of the data structure according the information to reconstruct the data flows as they were during the operation of the processor.

9. The apparatus as in claim 5 further comprising:

means for accessing a copy of the data structure having the initial state;

means for reading the information stored in the trace buffer; and means for processing the copy of the data structure according the information while accessing the data structure to analyze the data flows in real-time.

10. The apparatus as in claim 1 wherein the memory includes a virtual memory storing the data structure at a plurality of address spaces;

means for detecting a context switch of the plurality of address spaces; and means, responsive to the context switch, for recording information related to the context switch.

11. The apparatus as in claim 10 wherein the information related to the context switch is an identifier of one of the plurality of address spaces.

12. A method for tracing data flows during an operation of a processor comprising:

storing a data structure having an initial state in a memory, the data structure including addresses, the addresses for accessing data of the data structures;

storing the data in a plurality of registers while the data structure is manipulated by the processor;

accessing the data stored in the memory and in the plurality of registers;

detecting an unpredictable accessing of the data; and in response to detecting the unpredictable accessing, recording information related to the unpredictable accessing of the data to trace the data flows while the data structure is being manipulated by the processor.

13. The method as in claim 12 further comprising:

identifying the accessing of the data as direct memory-to-register, register-to-register, constant-to-register, and indirect memory;

setting the trace bit of the register to receive the data during the direct memory-to-register accessing;

propagating the trace bit from the register being used as a source of the data to the trace bit of the register being used as a destination of the data during the register-to-register accessing;

clearing the trace bit of the register receiving the data during the constant-to-register accessing;

recording the data of the register being used to determine an indirect address of the data structure during the indirect memory accessing if the trace bit of the register being used to determine the indirect address of the data structure is set.

14. The method as in claim 13 further comprising:

in responsive to the information being recorded, clearing the trace bit of the register being used to determine the indirect address of the memory.

15. The method as in claim 12 further comprising:

recording a time of an occurrence of the unpredictable accessing of the data with the information related to the unpredictable accessing of the data.

16. The method as in claim 12 further comprising:

storing the information related to the unpredictable accessing of the data in a queue, the queue having a plurality of entries, each entry storing the information for an occurrence of the unpredictable accessing of the data;

reading the information stored in the plurality of entries of the queue with a driver;

communicating the information read by the driver from the queue to a trace buffer, the port communicating the information at a rate determined by a clock signal generated by the processor.

17. The method as in claim 12 further comprising:

storing the information related to the unpredictable accessing of the data in a queue, the queue having a plurality of entries, each entry storing the information for an occurrence of the unpredictable accessing of the data;

signaling when the queue is full; and in response to a signal which indicates that the queue is full, communicating the information from the queue to the memory.

18. The method as in claim 16 further comprising:

allocating a portion of the memory as the trace buffer.

19. The method as in claim 16 further comprising:

accessing a copy of the data structure having the initial state;

reading the information stored in the trace buffer; and processing the copy of the data structure according the information to reconstruct the data flows as they were during the operation of the processor.

20. The method as in claim 16 further comprising:

accessing a copy of the data structure having the initial state;

reading the information stored in the trace buffer; and processing the copy of the data structure according the information while accessing the data structure to analyze the data flows in real-time.

21. The method as in claim 12 wherein the memory includes a virtual memory storing the data structure at a plurality of address spaces;

detecting a context switch of the plurality of address spaces; and in response to the context switch, recording information related to the context switch.

22. The method as in claim 21 wherein the information related to the context switch is an identifier of one of the plurality of address spaces.

23. An apparatus for tracing a data flow while accessing a data structure stored in a memory connected to a processor comprising:

means for detecting an unpredictable accessing of the data structure by the processor inaccording with data accessing instructions of the processor, the means for detecting being independent of detecting an execution flow of the processor; and means, responsive to the unpredictable accessing of the data structure, for recording information related to the unpredictable accessing of the data structure.

* * * * *